US009482997B2

United States Patent
Matsuura

(10) Patent No.: US 9,482,997 B2
(45) Date of Patent: *Nov. 1, 2016

(54) IMAGE FORMING APPARATUS EXECUTING A START-UP PROCESS OF A FIXING PORTION, WHEN A DETECTING PORTION DETECTS THE EXISTENCE OF AN OPERATOR BEFORE RECEIPT OF AN IMAGE FORMATION INSTRUCTION

(71) Applicant: CANON KABUSHIKI KAISHA, Tokyo (JP)

(72) Inventor: Daigo Matsuura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,265

(22) Filed: Dec. 15, 2015

(65) Prior Publication Data

US 2016/0097999 A1  Apr. 7, 2016

Related U.S. Application Data

(62) Division of application No. 14/452,705, filed on Aug. 6, 2014, now Pat. No. 9,244,402.

(30) Foreign Application Priority Data

Aug. 10, 2013 (JP) .................... 2013-167172

(51) Int. Cl.
  *G03G 15/20* (2006.01)
  *G06K 15/00* (2006.01)
(52) U.S. Cl.
  CPC ........ *G03G 15/2039* (2013.01); *G03G 15/205* (2013.01); *G06K 15/005* (2013.01)
(58) Field of Classification Search
  CPC ............. G03G 15/205; G03G 15/005; G03G 15/2039

USPC .............................................. 399/45, 70, 81
See application file for complete search history.

(56) References Cited

U.S. PATENT DOCUMENTS 6,381,422 B1  4/2002 Tanaka
7,200,354 B2  4/2007 Nakamoto et al.
(Continued)

FOREIGN PATENT DOCUMENTS

CN    101581896 A    11/2009
JP    09251259 A  *  9/1997
(Continued)

OTHER PUBLICATIONS

Japanese Office Action dated Nov. 5, 2015 in counterpart Japanese Application No. 2014-128148.

(Continued)

*Primary Examiner* — Susan Lee
(74) *Attorney, Agent, or Firm* — Fitzpatrick, Cella, Harper & Scinto

(57) ABSTRACT

An image forming apparatus includes: a recording material accommodating portion configured to accommodate a recording material; an image forming portion configured to form a toner image on the recording material fed from the recording material accommodating portion; a fixing portion configured to heat-fix the toner image formed on the recording material by the image forming portion; a storing portion configured to store information corresponding to the type of the recording material accommodated in the recording material accommodating portion; a detecting portion configured to detect that an operator exists in a predetermined zone in a neighborhood of the image forming apparatus; and an executing portion configured to execute a start-up process of the fixing portion, when the detecting portion detects the existence of the operator before the image forming apparatus receives an image formation instruction, over a time depending on the information stored in the storing portion.

10 Claims, 11 Drawing Sheets

(56) References Cited

U.S. PATENT DOCUMENTS

| | | |
|---|---|---|
| 7,457,576 B2 | 11/2008 | Takada et al. |
| 7,466,950 B2 | 12/2008 | Matsuura et al. |
| 7,596,348 B2 | 9/2009 | Nakamoto et al. |
| 7,794,040 B2 * | 9/2010 | Snyder |
| 7,844,208 B2 | 11/2010 | Hayashi et al. |
| 8,326,199 B2 | 12/2012 | Koshida et al. |
| 8,340,544 B2 | 12/2012 | Hosoda |
| 8,358,945 B2 | 1/2013 | Kunii |
| 8,649,720 B2 | 2/2014 | Koshida et al. |
| 9,007,618 B2 * | 4/2015 | Harada |
| 2008/0170258 A1 * | 7/2008 | Yamamura |
| 2009/0016759 A1 | 1/2009 | Ashikawa et al. |
| 2009/0279913 A1 | 11/2009 | Hosoda |
| 2010/0232818 A1 | 9/2010 | Kunii |
| 2013/0050736 A1 * | 2/2013 | Akahira ............. G03G 15/5016 |
| 2014/0092414 A1 * | 4/2014 | Tezuka |

FOREIGN PATENT DOCUMENTS

| | | |
|---|---|---|
| JP | 2006-030823 A | 2/2006 |
| JP | 2009-037208 A | 2/2009 |
| JP | 2009-276381 A | 11/2009 |
| JP | 2010-211044 A | 9/2010 |
| JP | 2012-118259 A | 6/2012 |
| JP | 2013-109292 A | 6/2013 |

OTHER PUBLICATIONS

Japanese Office Action dated Feb. 9, 2016, in counterpart Japanese Application No. 2014-128148.

Chinese Office Action dated May 9, 2016, in counterpart Chinese Application No. 201410387963.1.

Office Action in Japanese Patent Application No. 2015-249605, mailed Aug. 9, 2016.

* cited by examiner

IMAGE FORMING APPARATUS EXECUTING A START-UP PROCESS OF A FIXING PORTION, WHEN A DETECTING PORTION DETECTS THE EXISTENCE OF AN OPERATOR BEFORE RECEIPT OF AN IMAGE FORMATION INSTRUCTION

This is a division of U.S. patent application Ser. No. 14/452,705, filed on Aug. 6, 2014.

FIELD OF THE INVENTION AND RELATED ART

The present invention relates to an image forming apparatus for forming a toner image on a recording material. As this image forming apparatus, it is possible to cite an image forming apparatus, employing an electrophotographic process, and an electrostatic recording process or the like, represented by, e.g., a copying machine, a printer, a facsimile machine, a multi-function machine having the functions of these machines, or the like.

In a conventional image forming apparatus of an electrophotographic type, a constitution in which an unfixed toner image is formed on the recording material by an image forming process mechanism is employed. Further, a fixing process for heat-fixing the unfixed toner image on the recording material by a fixing device incorporated in the image forming apparatus is performed.

In such a fixing device, shortening of a start-up time (waiting time of an operator) until the fixing device is capable of performing a fixing process leads to convenience of the operator.

Therefore, in a fixing device described in Japanese Laid-Open Patent Application (JP-A) 2010-211044, during a start-up process, a fixing member is increased in temperature up to a fixable temperature and thereafter a pre-heating (idling) operation is performed such that the fixing member is further heated for a certain time. As a result, the fixing device accumulates heat, and therefore, an excessive temperature lowering with the start-up process performed thereafter is prevented.

Further, in the fixing device described in JP-A 2010-211044, the pre-heating time is changed depending on the type (material, thickness, size, or the like) of the recording material identified by receiving a print instruction. Specifically, the fixing member is increased in temperature up to the fixable temperature by turning on a power source (i.e., pressing down a main switch) of the image forming apparatus, and a subsequent pre-heating time is determined depending on information about the type of the recording material included in the print instruction reserved during the temperature rise. That is, a constitution in which the pre-heating time cannot be determined until the operator (user) pushes a copy start button is employed.

On the other hand, a method is considered that, before receiving the print instruction (before the operator pushes the copy start button), the start-up process of the fixing device is started (so-called proactive control). That is, e.g., the method is such that the start-up process of the fixing device is started at the time when some key operation is performed at an operating portion before the operator pushes the copy start button. As a result, it becomes possible that the waiting time of the operator is further shortened.

Here, in the case where the time when the pre-heating that is performed during the start-up process is set, depending on the recording material (e.g., the thickest paper), requiring a longest pre-heating time, for recording materials of all types recommended for use in the image forming apparatus, there is the following fear.

That is, when a constitution in which the time of the pre-heating performed during the start-up process is determined under a condition such that the type of the objective recording material is extended to recording materials which are not accommodated in the image forming apparatus is employed, there is the following fear.

For example, a status in which only thin paper is accommodated in the image forming apparatus is assumed. When the time of the pre-heating performed during the start-up process is set at a pre-heating time for the thickest paper although the status of the image forming apparatus is to heat-fix thin paper, efficiency is not high. Accordingly, for the recording material accommodated in the image forming apparatus, the pre-heating is carried out over a longer time than necessary, so that there is a fear that energy is consumed uselessly.

SUMMARY OF THE INVENTION

A principal object of the present invention is to provide an image forming apparatus capable of shortening the waiting time of an operator to the extent possible and capable of suppressing energy consumption required for performing a start-up process.

According to an aspect of the present invention, there is provided an image forming apparatus comprising: a recording material accommodating portion configured to accommodate a recording material; an image forming portion configured to form a toner image on the recording material fed from the recording material accommodating portion; a fixing portion configured to heat-fix the toner image formed on the recording material by the image forming portion; a storing portion configured to store information corresponding to the type of the recording material accommodated in the recording material accommodating portion; a detecting portion configured to detect that a predetermined operation is performed by an operator before the image forming apparatus receives an image formation instruction; and an executing portion configured to execute a start-up process, when the detecting portion detects the predetermined operation performed by the operator, over a time depending on the information stored in the storing portion.

According to another aspect of the present invention, there is provided an image forming apparatus comprising: a plurality of recording material accommodating portions each configured to accommodate a recording material; an image forming portion configured to form a toner image on the recording material fed from one of the plurality of recording material accommodating portions; a fixing portion configured to heat-fix the toner image formed on the recording material by the image forming portion; a storing portion configured to store information corresponding to the type of the recording material accommodated in each of the plurality of recording material accommodating portions; a detecting portion configured to detect that a predetermined operation is performed by an operator before the image forming apparatus receives an image formation instruction; and an executing portion configured to execute a start-up process, for the recording material requiring the longest time for performing the start-up process of the fixing portion, depending on the information stored in the storing portion.

According to a further aspect of the present invention, there is provided an image forming apparatus comprising: a plurality of recording material accommodating portions each configured to accommodate a recording material; an image forming portion configured to form a toner image on the recording material fed from one of the plurality of recording material accommodating portions; a fixing portion configured to heat-fix the toner image formed on the recording material by the image forming portion; an operating portion provided with a plurality of keys for permitting inputting of an instruction by an operator; and an executing portion configured to start execution of a start-up process of the fixing portion with an operation of any one of the keys at the operating portion before receiving an image formation instruction and configured to execute a start-up process for the recording material, requiring the longest time for performing the start-up process of the fixing portion, of the recording materials accommodated in the plurality of recording material accommodating portions.

These and other objects, features and advantages of the present invention will become more apparent upon a consideration of the following description of the preferred embodiments of the present invention taken in conjunction with the accompanying drawings.

DESCRIPTION OF THE EMBODIMENTS

Embodiments of the present invention will be described specifically with reference to the drawings.

First Embodiment

Image Forming Apparatus

Figure 3:
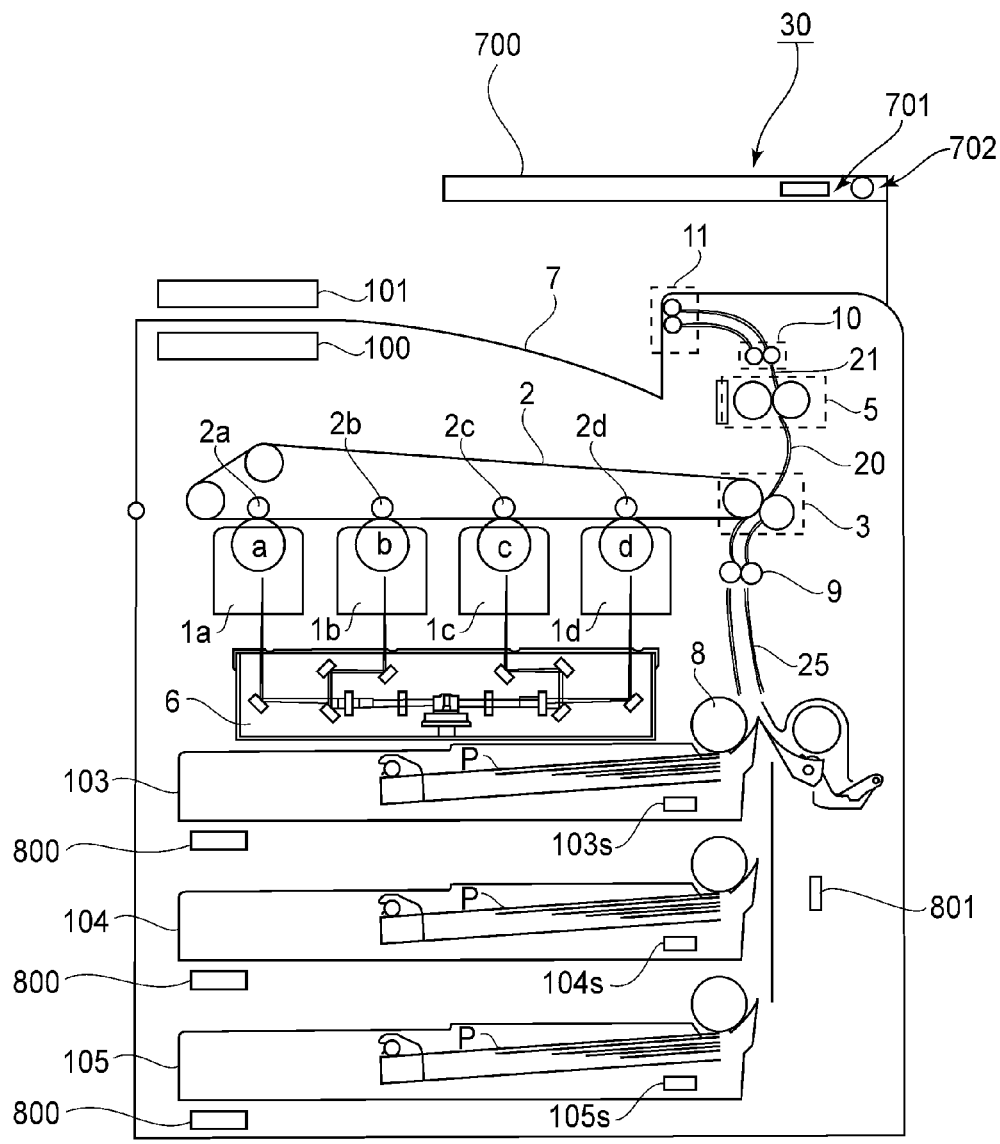
FIG. 3 is a schematic view for illustrating an image forming apparatus in which the fixing device is mounted in the First Embodiment.

FIG. 3 is an illustration of a structure of an image forming apparatus 30, according to a First Embodiment of the present invention, in which a fixing device is mounted. The image forming apparatus 30 in this embodiment is a multi-function machine having a copying function and a printer function in combination.

Specifically, at image forming portions 1a, 1b, 1c and 1d, each provided as an example of a toner image forming portion, a toner image is formed and then is transferred onto a recording material (sheet) P. Recording material cassettes 103, 104 and 105 as first, second and third accommodating portions, respectively, constituting recording material accommodating portions in a main assembly of the image forming apparatus accommodate the recording material P and are capable of feeding the recording material P to a secondary transfer portion 3. Each of the recording material cassettes 103, 104 and 105 is capable of accommodating the recording material P. Accordingly, a constitution is provided in which recording materials of different types can be accommodated among the recording material cassettes 103, 104 and 105.

The image forming apparatus 30 is an intermediary transfer-type, full-color copying machine of a tandem type in which the image forming portions 1a, 1b, 1c and 1d are arranged along a downward surface of an intermediary transfer belt 2. The image forming portions 1a, 1b, 1c and 1d are independently assembled into an exchanging (replacing) unit (process cartridge) detachably mountable to the main assembly of the image forming apparatus 30. Incidentally, the image forming apparatus 30 in this embodiment is usable as also a printer. Specifically, an image can be formed on the basis of image information inputted from an external personal computer 102, described later, in a connection relation with the image forming apparatus 30 via a LAN cable (communication line). At that time, together with the image information, information corresponding to the type and the number of sheets of the recording material P to be subjected to image formation is also inputted. These pieces of information are inputted into a controller (control portion) 100, so that the type of the recording material to be subjected to the image formation is identified.

At an upper portion of the image forming apparatus 30, an image reader (reading device) 700 is provided. The image reader 700 includes an original carriage (placing portion) on which an original is placed by an operator, an original cover (cover portion) for covering the placed original, and a sensor for detecting an open/close state of the original cover. Further, the image reader 700 includes an image reading portion 701 consisting of a CCD for reading the image information of the original. At the image forming portion described later, with pushing of a copy start button by the operator, the image is formed on the basis of the image information read by the image reading portion 701.

At the image forming portion 1a, a yellow toner image is formed on a photosensitive drum a and then is transferred onto the intermediary transfer belt 2. At the image forming portion 1b, a magenta toner image is formed on a photosensitive drum b and then is transferred onto the intermediary transfer belt 2. At the image forming portions 1c and 1d, a cyan toner image and a black toner image are formed on photosensitive drum c and a photosensitive drum d, respectively, and then are transferred onto the intermediary transfer belt 2.

The four color toner images transferred on the intermediary transfer belt 2 are fed to a secondary transfer portion 3, and then are collectively transferred onto the recording material P. The recording material P on which the four color toner images are transferred is heated and pressed by a fixing device 5 to fix the toner images on the surface thereof, and thereafter is discharged onto an upper tray 7 via a discharging roller pair 11.

A separation roller 8 separates sheets of the recording material P (recording paper), one by one, pulled out from the recording material cassette 103 and then feeds the separated recording material P toward a registration roller pair 9. The registration roller pair 9 receives the recording material P in a rest state and places the recording material P in a stand-by state, and thereafter sends the recording material P toward the secondary transfer portion 3 by being timed to the toner images on the intermediary transfer belt 2.

The image forming portions 1a, 1b, 1c and 1d have the substantially same constitution except that the colors of toners used in associated developing devices are yellow, cyan, magenta and black, respectively, and are different from each other. In the following, the image forming portion 1a is described, and with respect to other image forming portions 1b, 1c and 1d, a suffix a of each of reference numerals will be read as each of suffixes b, c and d for simplicity of description.

The image forming portion 1a incorporates therein a charging roller, the developing device and a drum cleaning device, which are not shown, so as to surround a periphery of the photosensitive drum a. The photosensitive drum a is prepared by forming a photosensitive layer on an outer peripheral surface of an aluminum-made cylinder, and rotates at a predetermined process speed. The photosensitive drum a is electrically charged to a uniform negative potential by using the charging roller.

An exposure device 6 scans the charged surface of the photosensitive drum a, via a rotating mirror, with a laser beam obtained by ON-OFF modulating scanning line image (picture) data developed from a separated color image for each of the colors, so that an electrostatic image for an image is written (formed) on the surface of the photosensitive drum a. The electrostatic image formed on the surface of the photosensitive drum a is reversely developed into a toner image by deposition of the toner thereon by the developing device.

A transfer roller 2a presses the intermediary transfer belt 2 to form a transfer portion Ta between the photosensitive drum a and the intermediary transfer belt 2. By applying a positive(-polarity) DC voltage to the transfer roller 2a, the negative toner image carried on the photosensitive drum a is primary-transferred onto the intermediary transfer belt 2 passing through the transfer portion Ta.

Then, as described above, the color toner images on the intermediary transfer belt 2 are transferred onto the recording material P at the secondary transfer portion 3 by a secondary transfer roller. Thereafter, the toner images on the recording material P are fixed as a permanent image on the recording material P by pressing and heating the recording material P by the fixing device 5, and then the recording material P is discharged onto the upper tray 7.

(Fixing Device)

Figure 2:
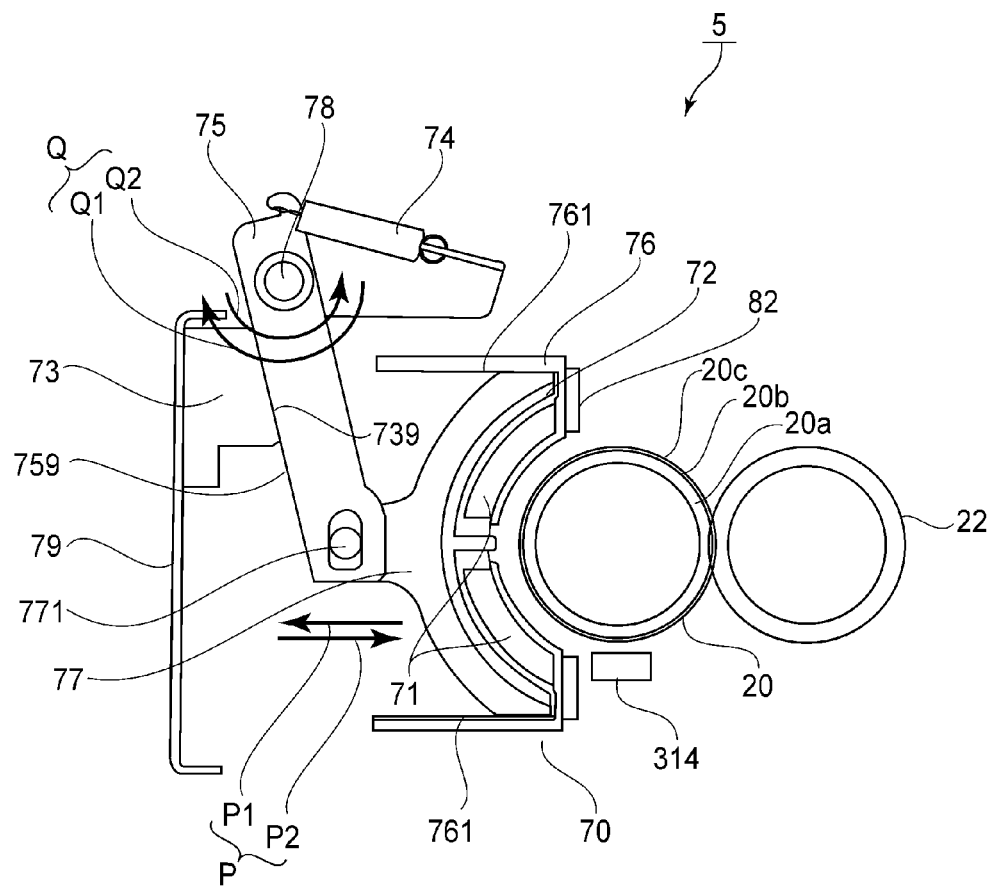
FIG. 2 is a schematic view for illustrating a fixing belt in the First Embodiment.
Figure 4:
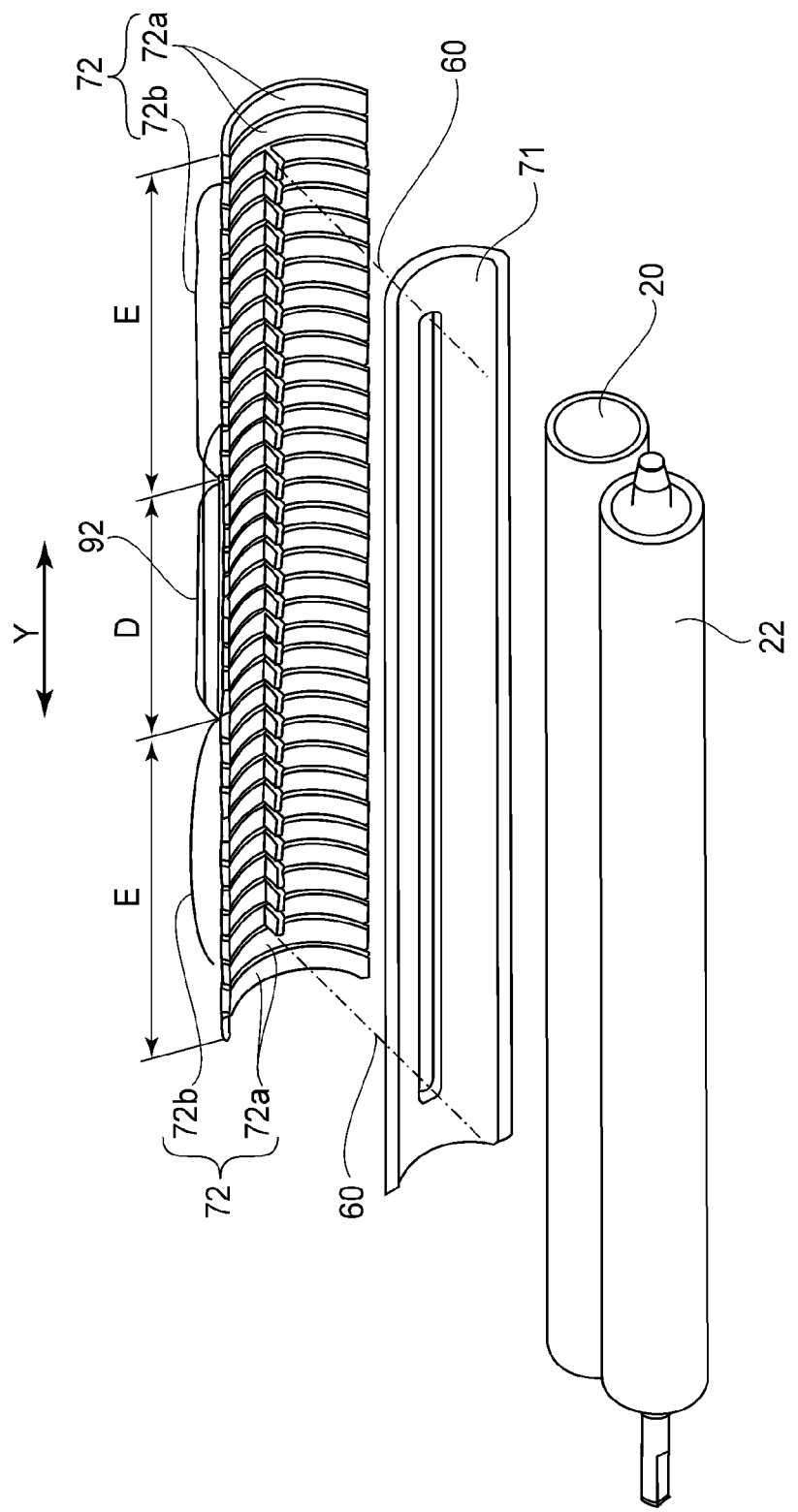
FIG. 4 is a perspective view of the fixing device in the First Embodiment.
Figure 5:
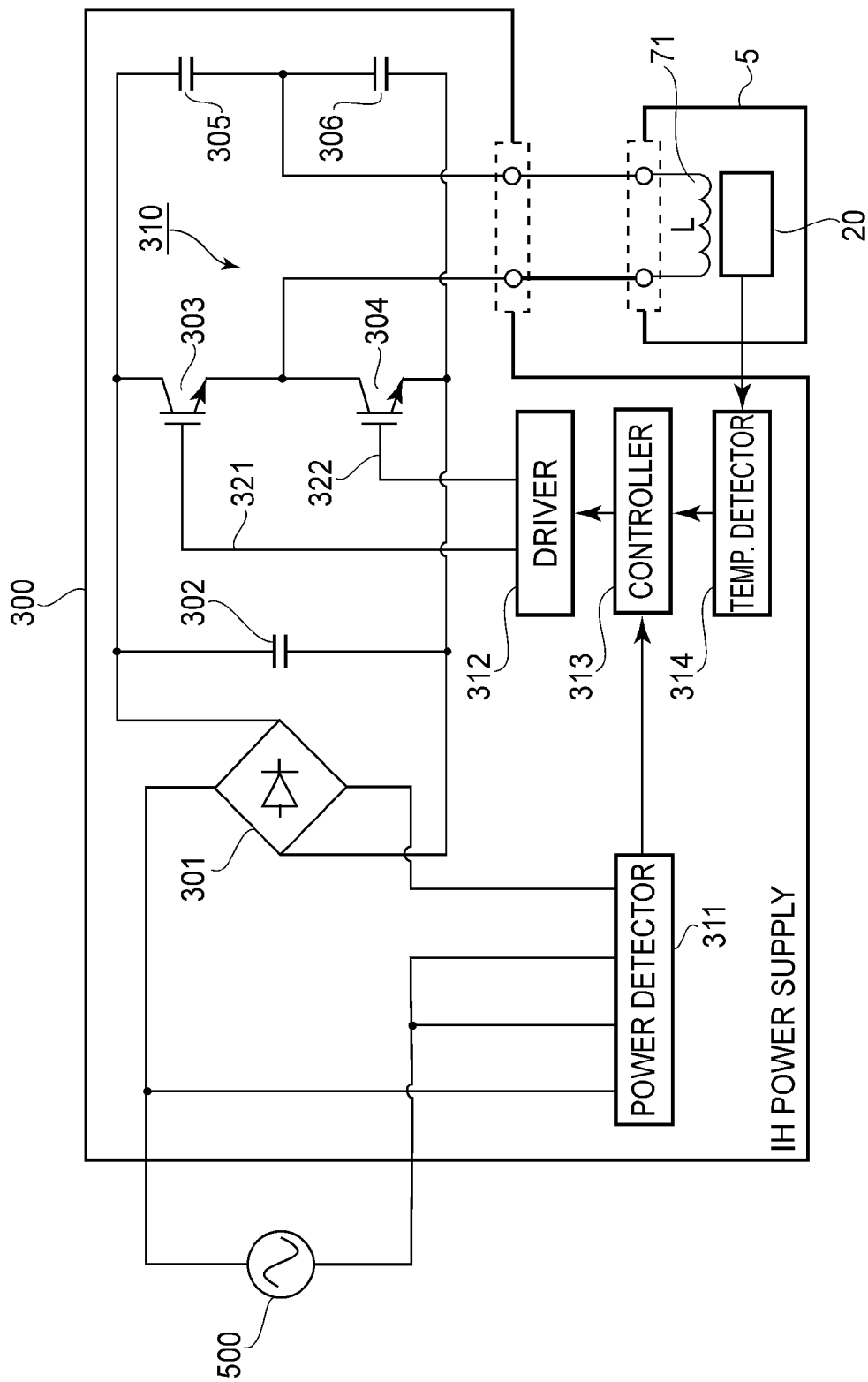
FIG. 5 is a block diagram for illustrating a power source (supply) in the First Embodiment.

FIG. 2 is an illustration of a structure of the fixing device 5 as a fixing portion of a heat-fixing type in this embodiment, and FIG. 4 is an illustration of arrangement of a fixing roller, an exciting coil and a magnetic core. Further, FIG. 5 is a circuit diagram of an induction-heating device. As shown in FIG. 2, a fixing roller 20 as an example of a rotatable heating member heats the recording material P on which the toner images are transferred. The fixing device 5 forms a heating nip N, through which the recording material P is to be nipped and conveyed, by press-contact of a pressing roller 22, with the fixing roller 20 with respect to a horizontal direction, as an opposing member disposed opposed to the fixing roller 20.

As shown in FIG. 2, the fixing roller 20 is prepared by providing an elastic layer 20b of a silicone rubber on an outer peripheral surface of a metal core pipe 20a of a magnetic material and then by coating an outer peripheral surface of the elastic layer 20b with a parting layer 20c composed of a fluorine-containing resin material. The pressing roller 22 is disposed opposed to the fixing roller 20 and is urged toward the fixing roller 20 by unshown exciting coil springs disposed at shaft portions on both sides thereof.

The pressing roller 22 is prepared by providing an elastic layer 22b of a silicone rubber on an outer peripheral surface of a metal core pipe 22a of a magnetic material and then by coating an outer peripheral surface of the elastic layer 22b with a parting layer 22c composed of a fluorine containing resin material. The fixing roller 20 and the pressing roller 22 are connected by an unshown gear train provided at a longitudinal end portion thereof, and are integrally rotated by being driven by an unshown driving motor connected to the gear train.

The fixing roller 20 is externally heated by an induction-heating device 70 principally including an exciting coil 71 provided at an outer periphery of the fixing roller 20, a magnetic core 72 and a magnetic circuit member 82. The induction-heating device 70 as an example of an induction-heating apparatus heats the fixing roller 20 by generating magnetic flux. The fixing roller 20 as an induction heat generating member uses ferromagnetic metal (having high magnetic permeability) such as iron, so that the magnetic flux generated from the induction-heating device 70 is constrained in a larger amount inside the metal. By increasing magnetic flux density, an eddy current is generated on the surface of the metal, so that the fixing roller 20 can be generated efficiently.

Inside a housing 76 of the fixing device 5, the exciting coil 71, formed in an arcuate shape with respect to a direction perpendicular to the drawing sheet, is disposed. A plurality of magnetic cores 72, which partly enter a central portion of the exciting coil 71 and which are divided with respect to the direction perpendicular to the drawing sheet, are disposed. The magnetic circuit member 82 forms a magnetic circuit of the magnetic flux generated by the exciting coil 71 so as to make a circuit around the magnetic core 72 and the metal core pipe 20a of the fixing roller 20.

The magnetic core 72 and the magnetic circuit member 82 are used for enhancement in magnetic circuit efficiency and magnetic shielding of the AC magnetic flux generated by the exciting coil 71. The magnetic core 72 uses, as a material, ferrite or the like having high permeability and low residual magnetic flux density in order to perform the function of efficiently guiding the AC magnetic flux to the induction heat generating member constituting the fixing roller 20.

As shown in FIG. 4, the exciting coil 71 has a substantially elliptical shape (elongated trough shape) with respect to a longitudinal direction, and is disposed along the outer peripheral surface of the fixing roller 20. The exciting coil 71 uses, as a wire core, the Litz wire, which is a bundle approximately 80-200 thin insulating coating electric wires each having a diameter of 0.1-0.3 mm. The wire core constitutes the exciting coil 71 by being wound 8-12 times around the magnetic core 72.

The magnetic core 72 is disposed in an arranged state in which the plurality portions thereof are arranged in a recording material feeding width direction perpendicular to a recording material feeding direction. The magnetic core 72 is constituted so as to connect a central portion and an outer peripheral surface of the exciting coil 71 in an arcuate shape in cross-section perpendicular to an axis of the fixing roller 20.

The fixing device 5 employs, in order to heat the fixing roller 20, an induction-heating type in which the eddy currents, generated by the magnetic flux by the exciting coil 71 in the induction heat generating member provided in the fixing roller 20, generate heat by Joule heat. In the induction-heating type, a heat generating position can be made very close to the heating nip N, and therefore compared with a heating roller type, during power-on, the time required until the surface temperature of the fixing roller 20 reaches a temperature suitable for fixing may be short. Further, the heat transfer path from the heat generating position to the heating nip N is short and simple, and therefore thermal efficiency of the heating is high.

When a high-frequency current is applied to the exciting coil 71, the fixing roller 20 generates heat. The exciting coil 71 generates the AC magnetic flux by the supplied AC current, and then the AC magnetic flux is guided by the magnetic core 72 to generate the eddy current in the fixing roller 20 as the induction heat generating member. The eddy current generates the Joule heat by a specific resistance of the induction heat generating member. That is, the fixing roller 20 is placed in an electromagnetic induction heat generating state by supplying the AC current to the exciting coil 71.

As shown in FIG. 5, an exciting circuit 310 supplies the high-frequency AC current to the exciting coil 71 of the fixing device 5. The exciting coil 71 is connected between a connecting point of switching elements 303 and 304 and a connecting point of capacitors 305 and 306 in the exciting circuit 310 of a power source (supply) device 300. The exciting coil 71 generates the magnetic flux to induction-heat the fixing roller 20.

The power source device 300 constitutes a rectifying smoothing circuit by a diode bridge 301 and a filter capacitor 302 to generate a DC voltage. A power controller 313 alternately actuates the switching elements 303 and 304 via a driving portion 312, thus applying an AC voltage to the exciting coil 71. Each of the capacitors 305 and 306 is a resonance capacitor forming a resonance circuit together with the exciting coil 71. The driving portion 312 drives each of the two switching elements 303 and 304.

A power detecting portion 311 detects input electric power of the power source device 300. A temperature detecting element 314 is provided in non-contact with the fixing roller 20 at a position opposing the surface of the fixing roller 20 as an electroconductive heat generating member, and detects the temperature of the fixing roller 20. The power controller 313 determines a condition, of electric power to be outputted by the driving portion 312, from an operation instruction from the controller 30 of the image forming apparatus 30 and a state of the fixing device 5 such as a detection result of the temperature detecting portion (element) 314. The driving portion 312 drives the two switching elements 303 and 304 in accordance with the power condition determined by the power controller 313.

(Setting of Pre-Heating Time Depending on Recording Material)

In this embodiment, the pre-heating time (a time for heating the fixing roller and for accumulating heat in the fixing device after the temperature of the fixing roller reaches a target temperature) in a start-up process (warm-up process) of the fixing device is set in the following manner. That is, the pre-heating time is set on the basis of information corresponding to the type (material, thickness, size) of the recording material accommodated in each of the plurality of recording material cassettes. As a result, the waiting time of a user (operator) is reduced, so that user convenience is realized.

Here, the start-up process (warm-up process) of the fixing device refers to a preparatory operation in which the state of the fixing device is transferred to a state, in which a fixing process can be performed, with main power-on (pushing-down of a main switch) of the image forming apparatus. Specifically, in the start-up process, with the power-on, electric power supply to the exciting coil 71 and rotation of the fixing roller are started, so that a heating operation of the fixing roller is performed.

More specifically, the process includes a first process for increasing the temperature of the fixing roller to the target temperature and a second process for continuously heating the fixing roller without introducing the sheet (recording material) into the fixing device in the state in which the temperature of the fixing roller reaches the target temperature (so-called idling). The time required for the second process corresponds to the pre-heating time described above.

Further, during the two processes, the fixing roller and the pressing roller are rotated in a mutually press-contacted state. Further, in this embodiment, the target temperature (control temperature) of the fixing roller is the same irrespective of the types of the recording materials. Incidentally, the target temperature of the fixing roller may also vary depending on the types of the recording materials.

Incidentally, such a start-up process of the fixing device is not limited to the above-described start-up process. For example, the start-up process is similarly performed also when the image forming apparatus is restored from a sleep mode (energy saving mode in which electric power supply to devices other than a device such as a CPU for effecting control of various devices), i.e., when a sub-power-switch 404 is pushed.

Figure 1:
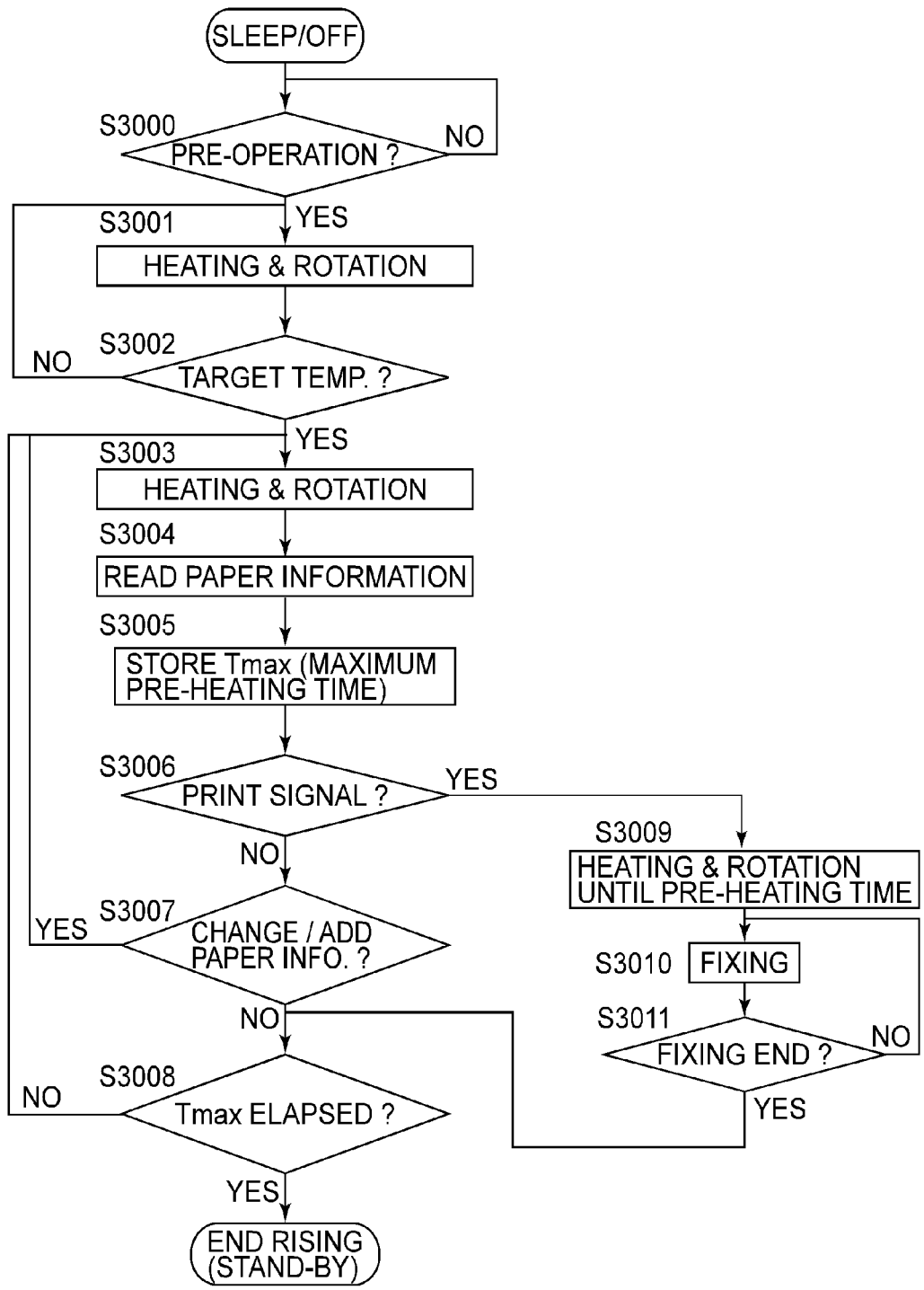
FIG. 1 is a flowchart for illustrating a fixing device in a First Embodiment.
Figure 6:
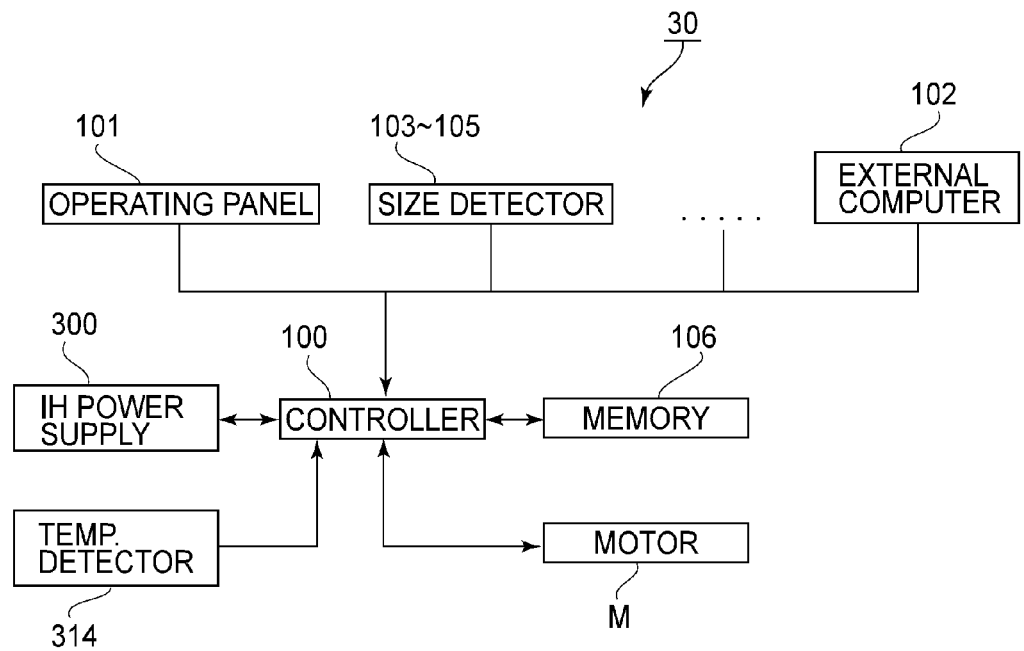
FIG. 6 is a block diagram for illustrating the fixing device in the First Embodiment.
Figure 7:
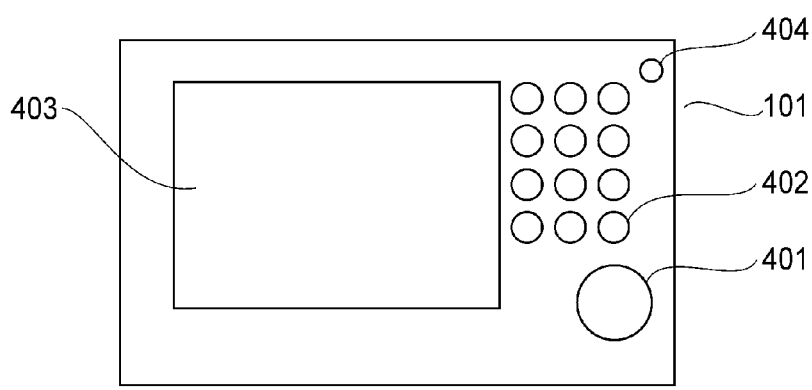
FIG. 7 is a schematic view for illustrating an operating panel in the First Embodiment.

FIG. 6 is a control block diagram of the image forming apparatus including the fixing device in this embodiment, and FIG. 1 is a flowchart of actuation control of the fixing device in this embodiment. FIG. 7 is a schematic view of an operating panel 101 in this embodiment. In this embodiment, the operating panel 101 is constituted by a liquid crystal display portion, and as described later, various instructions and selections can be made by touch operation by the operator.

As shown in FIG. 6, the controller 100 is a central control unit (CPU) for controlling an operation of the image forming apparatus 30. Further, the controller 100 sets, on the basis of basis weight information of the recording materials accommodated in the recording material cassettes 103, 104 and 105, the pre-heating time as an additional heating time after the temperature of the fixing roller 20 reaches a fixable temperature.

The basis weight of the recording material is discriminated on the basis of operation contents by the operator through the operating panel 101 or recording material information sent from the external computer 102. Recording material size detecting portions 103 to 105 detect the basis weights of the recording materials mounted in the recording material cassettes 103 to 105 on the basis of outputs of sensors 103s to 105s are provided in the three recording material cassettes 103 to 105. The sensors 103s to 105s irradiate the recording materials P set in the recording material cassettes 103 to 105 with ultrasonic waves, and then detect the recording material basis weights from associated pieces of attenuated amplitude information. These pieces of the recording material information are stored in a nonvolatile memory 106 (FIG. 6) functioning as a storing portion, and then are used during a subsequent power-on operation.

Incidentally, the types of the recording materials accommodated in the recording material cassettes 103 to 105 can also be registered by the operator through a touch panel 403 provided on the operating panel 101. In this case, the pieces of information corresponding to the types of the recording materials registered through the touch panel 403 are similar stored in the memory 106 and are used for setting the pre-heating time in the start-up process.

(Proactive Start)

As shown in FIG. 7, the image forming apparatus is provided with the separating panel 101 as an operating portion including a plurality of keys for permitting key operations for performing instructions by the operator. The operating panel 101 includes a start button (a button for providing an instruction to start image formation (copying)) 401, numeric input buttons (numeric buttons from 0 to 9) 402, and the above-described sub-power switch 404, which are hard-keys (portions where the operator performs the key operations). Further, the operating panel 101 is provided with the touch panel 403 constituting a liquid crystal display portion.

At this touch panel 403, the following buttons (keys) are displayed. The buttons are instruction buttons, relating to image formation, such as a button for setting the type of the recording material (for setting the basis weight of the sheet), a button for providing an instruction of image formation on both (double) sides of the recording material, and a button for providing an instruction of stapling (process), which are soft-keys (portions where the operator performs the key operations). The operator touches these buttons (keys), whereby various instructions are provided. A constitution in which the pieces of information designated by the operator through the operating panel 101 as described above are sent to the controller 100 is employed.

The controller 100 detects (discriminates) the operation statuses of the operating panel 101 and the recording material cassettes 103 to 105, and then performs the following operation before receiving an image formation instruction after designation of a print number and the type of the recording material (i.e., before the copy start button is pushed). That is, when the operator (user) performs a predetermined operation, although the type of the recording material to be subjected to the image formation is not clear, the start-up process of the fixing device is started in advance. This is referred to as proactive start but will be also referred to as proactive control.

In the proactive control effected on the basis of the predetermined operation performed by the operator, in order to prevent useless energy consumption by further enhancing reliability, it is preferable that the proactive control is interrelated with an operation by which there is high possibility that the user (operator) performs a printing operation. Therefore, in this embodiment, a constitution is employed in which the proactive control is started by using, as a trigger, the case where the button 401 or 402 of the operating panel 101 or the touch panel 403 is operated.

Incidentally, the triggers (condition) for starting the proactive control are not limited to such a case. The proactive control may also be started on the basis of detection by the sensor that an original is placed on the original carriage of the original reader 700 by the operator. Further, the proactive control may also be started on the basis of detection by the sensor 702 (FIG. 3) that at least one of an opening operation and a closing operation of the original cover of the original reader 700 is performed.

Further, as the trigger for starting the proactive control, the proactive control may also be started on the basis of detection that the user is in a predetermined position in the neighborhood of the image forming apparatus 30 by a human sensor (motion detector) such as a thermopile or a pyroelectric sensor (element) or by a camera (image pick-up device), which is provided on the image forming apparatus. Further, the proactive control may also be started on the basis of detection that the recording material P is newly set in either one of the recording material cassettes 103 to 105, i.e., that at least one of a pulling-out operation and an inserting operation of the associated recording material cassette is detected by a sensor 800 (FIG. 3).

(Flowchart)

In the following, by using a flowchart of FIG. 1, an operation in this embodiment will be described. The control in this embodiment is effected when the power-on (pushing of the main switch) or one of the above-described predetermined operations as the trigger for starting the proactive control is performed from a power-off state (S3000).

The controller 100 drives a driving motor M to rotate the pressing roller 22 and the fixing roller 20. Then, the power source controller 313 (FIG. 5) applies a high-frequency voltage to the exciting coil 71 until the temperature of the fixing roller 20 reaches the target temperature, thus causing the fixing roller 20 to generate heat (S3001). Then, on the basis of an output of the temperature sensor 314, whether or not the temperature of the fixing roller 20 reaches the target temperature is discriminated (S3002). The controller 100 reads, from the memory (storing portion) 106, the information corresponding to the type of the recording material accommodated in the associated recording material cassette (S3004).

The controller 100 sets, as Tmax, a pre-heating time of the recording material requiring a longest pre-heating time of the recording materials accommodated (mounted) in the recording material cassettes 103, 104 and 105, on the basis of Table 1 (appearing later) showing a relationship between the basis weight of the recording material and a necessary pre-heating time. Then, this value is stored, in the memory 106, as a permitted value to be compared with a measured value (S3005). These operations are performed at the time before the controller 100 receives the print start signal (before the copy start button 401 is pushed down).

The controller 100 checks, during the start-up process, whether or not there is an ON operation (printing signal) of the copy start button 401 (S3006). In the case where there is the printing signal in S3006, a heating operation and a rotating operation are performed until the a time reaches the pre-heating time, depending on the information of the recording material to be subjected to the printing, and then a fixing operation is started (S3009 and S3010). That is, in S3009, in the case where the type of the recording material is identified (known) during the start-up process, the control is changed to control such that the start-up process depending on the identified type of the recording material is formed. Then, the measurement of the pre-heating time is made by a timer (measuring portion) incorporated in the controller 100.

After the fixing operation is ended (S3011), whether or not the time after the temperature reaches the target temperature in the operation inducing the fixing operation reaches Tmax is discriminated (S3008), and then in the case where the time does not reach Tmax, the pre-heating is continued, and in the case where the time reaches Tmax, the state of the image forming apparatus goes to a stand-by state.

In the case where in S3006, there is no printing signal (image formation instruction), but a change or addition of set information of the recording material is detected by the recording material size detecting portions 103 to 105 or the like (S3007), the recording material information is read again and then a value of Tmax is set again. In the case where in S3006, there is no printing signal and there are no change and addition of the set information of the recording material, the start-up process is ended at the time when the pre-heating time from the time when the fixing roller temperature reaches the target temperature reaches Tmax (S3008), and then the state of the image forming apparatus goes to the stand-by state.

According to the flow in this embodiment, even when the proactive control is started based on the power-on or the predetermined operation by the user and then the status is such that the type of the recording material P to be subjected to the image formation is not clear during the start-up process, it is possible to place the image forming apparatus in a state in which the fixing operation can be performed while shortening the waiting time. In the case where the type of the recording material to be subjected to the image formation is identified during the start-up process, the constitution in which the start-up process is performed for the pre-heating time depending on the type of the identified is employed, and therefore similarly, it is possible to place the image forming apparatus in the state in which the fixing operation can be performed while shortening the waiting time.

On the other hand, in the case where the image forming apparatus receives the printing signal from the external computer (external device independent from the image forming apparatus) 102 or the like via the LAN cable, in this printing signal, together with original image data) of an image to be printed (formed), a signal including the information corresponding to the type of the recording material is included. Accordingly, in such a case, the type of the recording material is discriminated by the controller 100 on the basis of the information included in the input signal, and then the start-up process is carried out so that the time is the pre-heating time depending on the discriminated recording material (S3009). That is, in such a case, the proactive control is not effected.

In this embodiment, after the pre-heating time reaches Tmax, the feeding of the recording material P from each of the recording material cassettes is started, but the pre-heating time may also be offset in consideration of a feeding time of the recording material P from each of the recording material cassettes 103, 104 and 105 to the heating nip N.

TABLE 1

| | BW*[1] (g/m$^2$): | | | | |
|---|---|---|---|---|---|
| | 52-63 | 64-82 | 83-105 | 106-220 | 221-300 |
| NPHT*[2] (sec): | 0 | 30 | 90 | 0 | 0 |
| ONPM*[3] (sheets): | 70 | 70 | 70 | 35 | 23.3 |
| FS*[4] (mm/s): | 300 | 300 | 300 | 150 | 100 |

*[1]"BW" represents the basis weight.
*[2]"NPHT" represents the necessary pre-heating time.
*[3]"ONPM" represents the output (sheet) number per minute (productivity).
*[4]"FS" represents a (sheet) feeding speed.

Here, in Table 1, the relation between the basis weight of paper and the necessary pre-heating time will be described specifically. With respect to the recording material which is used as thick paper and which is 106-300 g/m$^2$ in basis weight, the fixing property is ensured by lowering the productivity and the feeding speed, and therefore the degree of a lowering in temperature of the fixing roller 20 is small, so that there is no need to perform the pre-heating. With respect to the recording material, which is used as plain paper and which is 52-105 g/m$^2$ in basis weight, the number of sheets of the recording material required to be heated per minute is large, and therefore the degree of the lowering in temperature of the fixing roller 20 is large.

Further, with respect to the recording material having the basis weight of approximately 52-63 g/m$^2$, the amount of heat taken from the fixing roller 20 is small, and therefore the lowering in temperature is not generated even when the pre-heating is not performed. With respect to the recording material having the basis weight of 64-105 g/m$^2$, when the pre-heating is not performed, the lowering in temperature is generated and thus improper fixing is generated. Particularly, with respect to the recording material classified as the recording material having the basis weight of 83-105 g/m$^2$, when the pre-heating is not performed for 90 seconds, due to the lowering in temperature, the improper fixing is generated.

From Table 1, Tmax is 90 seconds in the case where the sheets of 52 g/m$^2$ in basis weight, the sheets of 105 g/m$^2$ in basis weight and the sheets of 220 g/m$^2$ in basis weight are set in the recording material cassettes 103, 104 and 105, respectively. Further, Tmax is 0 seconds in the case where the recording material having the basis weight of 52 g/m$^2$ is set in all the recording material cassettes 103 to 105.

When the pre-heating is performed for Tmax (seconds) as the pre-heating time, the pre-heating is performed for the longest necessary pre-heating time for the recording material of the recording materials set in the recording material cassettes 103 to 105. Therefore, even in the case where the recording material is supplied from any of the recording material cassettes, the degree of heat accumulation of the fixing roller 20 is sufficient, so that the improper fixing due to the lowering in temperature of the fixing roller after the start of the image formation is not generated.

On the other hand, in a conventional method, the pre-heating was always performed for 90 seconds which was the longest pre-heating time in Table 1. In this case, only the recording materials having the basis weights of 52 g/m$^2$ and 64 g/m$^2$ for which the pre-heating times are 0 second and 30 seconds, respectively, are accommodated in the recording material cassettes, the pre-heating is performed for 90 seconds, and therefore the operator waits the start of image formation more than necessary. In other words, image formation start timing is delayed more than necessary, and as a result, the time until the recording material on which the image is formed is discharged becomes long.

In this way, in the First Embodiment, the start-up process started with the predetermined operation (pre-operation) of the operator is not carried out for a long time more than necessary, and therefore it is possible to avoid useless energy consumption. Further, it is possible to reduce the degree of discomfort of the user (operator) kept waiting after the operator performs the predetermined operation (pre-operation).

Further, in this embodiment, the target temperature is constant irrespective of the basis weights of the recording materials, but the pre-heating can also be performed at the target temperature, depending on the type of the recording material, as soon as the recording material type, such as the basis weight or the size of the recording material P or the presence or absence of a coating agent, is known. In this way, by using the target temperature optimized depending on the recording material type, it is possible to obtain a high image glossiness by setting a high target temperature for coated paper or the like.

Further, in this embodiment, the image forming apparatus including the plurality of the recording material cassettes is described, but the present invention is not limited thereto. The present invention is similarly applicable to also an image forming apparatus including only a single recording material cassette. That is, the convenience to the user can be improved by carrying out the start-up process (including the temperature rise step and the heat accumulation step), with the above-described predetermined operation by the user, for a time depending on the type of the recording material accommodated in the single recording material cassette.

Second Embodiment

Figure 8:
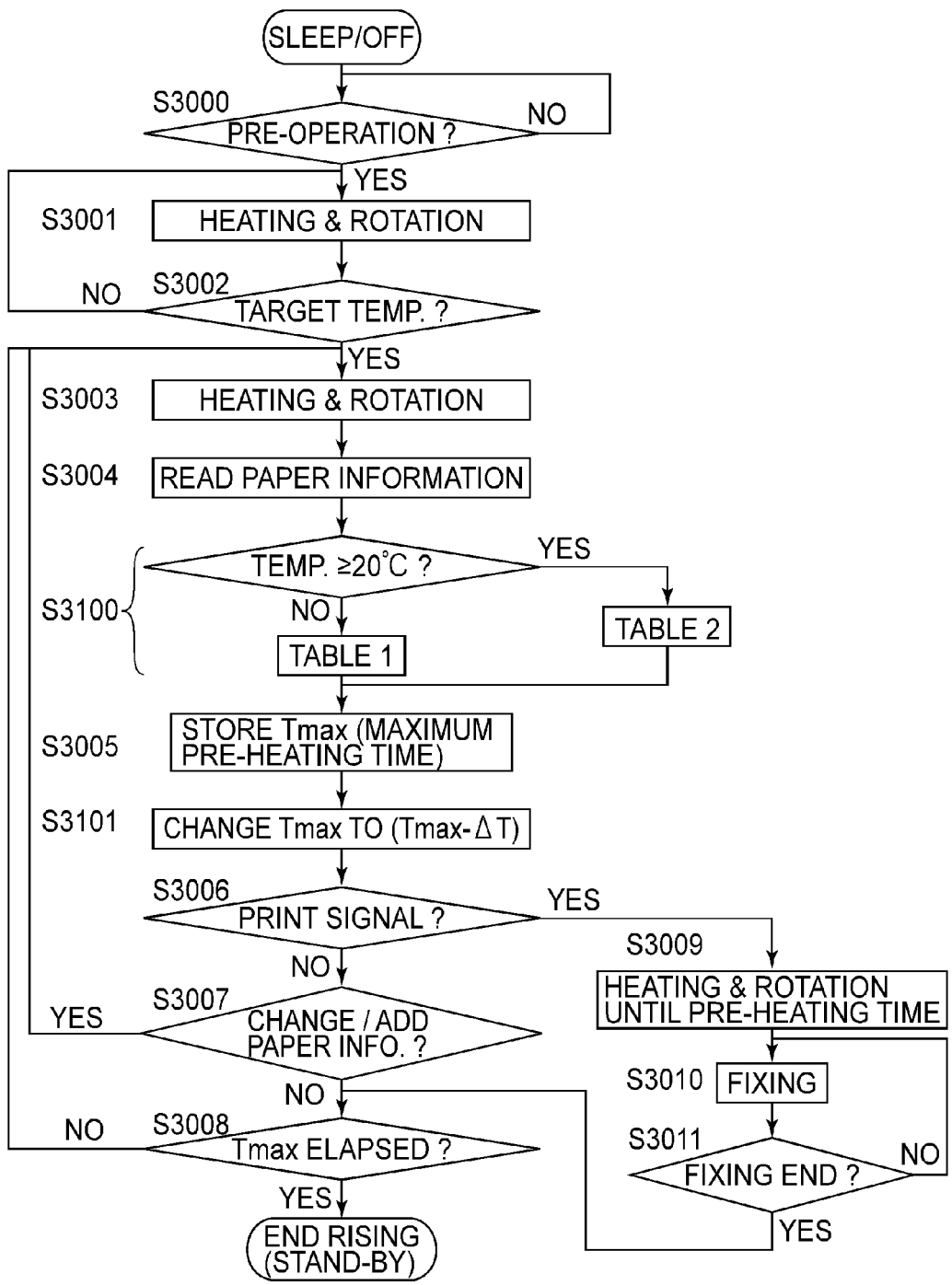
FIG. 8 is a flowchart for illustrating a fixing device in a Second Embodiment.

The Second Embodiment is different from the First Embodiment in that Tmax is set again on the basis of detected temperature information of the temperature detecting portion (FIG. 6). Control in this embodiment is identical in apparatus constitution and control for image formation and the like to the control in the First Embodiment except that the flowchart of FIG. 1 is replaced with a flowchart of FIG. 8. In the following, the flowchart of FIG. 8 will be described, but steps in which the operations similar to those in the First Embodiment are represented by the same reference symbols and will be omitted from description.

In this embodiment, for calculating Tmax, the necessary pre-heating time table is changed on the basis of detection information of a temperature and humidity detecting portion 801 provided at a periphery of the recording material cassettes 103, 104 and 105 disposed inside the main assembly of the image forming apparatus (S3100). Table 2 appearing later in a pre-heating time table in the case where the temperature of the temperature and humidity detecting portion 801 disposed in the neighborhood of the recording material is 20° C. or more. In the case where the recording material temperature is high, the degree of heat transfer from the fixing roller 20 toward the recording material is decreased, and therefore the degree of the lowering in temperature is decreased even when the pre-heating time is shortened.

In this embodiment, the temperature at the periphery of the recording material cassettes is detected by the temperature and humidity detecting portion 801, but the temperature and humidity detecting portion 801 may also be disposed at any position, in the main assembly of the image forming apparatus, where the temperature of the recording material can be estimated. However, the detecting portion 801 may more preferably be disposed at a position where the detecting portion 801 is less influenced by the heat of the fixing device 5.

TABLE 2

| | BW*[1] (g/m²): | | | | |
|---|---|---|---|---|---|
| | 52-63 | 64-82 | 83-105 | 106-220 | 221-300 |
| NPHT*[2] (sec): | 0 | 10 | 20 | 0 | 0 |
| ONPM*[3] (sheets): | 70 | 70 | 70 | 35 | 23.3 |
| FS*[4] (mm/s): | 300 | 300 | 300 | 150 | 100 |

*[1]"BW" represents the basis weight.
*[2]"NPHT" represents the necessary pre-heating time.
*[3]"ONPM" represents the output (sheet) number per minute (productivity).
*[4]"FS" represents a (sheet) feeding speed.

In this embodiment, the temperature of the fixing roller 20 at the time of start of heating is detected, and a value obtained by subtracting a pre-heating time offset ΔT, shown in Table 3 appearing later, from Tmax calculated from the pre-heating time table (Table 2) is newly set as Tmax (S3101). Table 3 shows relationship between the temperature of the fixing roller 20 at the time of start of the heating and the pre-heating time offset ΔT. In the case where the temperature of the fixing roller 20 is high (41° C. or more), the heat accumulation of the fixing roller 20 has already been made, and therefore the pre-heating time can be reduced. Incidentally, without changing the pre-heating time table depending on the fixing roller temperature, as an alternative of the newly set Tmax, a value obtained by subtracting a constant value, depending on the fixing roller temperature, from Tmax may also be used.

TABLE 3

| | FRT*[1] (° C.): | | | | |
|---|---|---|---|---|---|
| | ≤40 | 41-80 | 81-120 | 121-160 | 161≤ |
| PHTO*[2] ΔT (sec): | 0 | 5 | 10 | 20 | 30 |

*[1]"FRT" represents the fixing roller temperature.
*[2]"PHTO" represents the pre-heating time offset.

As described above, according to this embodiment, the user waiting time can be further reduced, so that it becomes possible to improve the user convenience.

Third Embodiment

In the First Embodiment, the pre-heating time is determined on the basis of the plurality of the pieces of the recording material basis weight information, but in this embodiment, different from the First Embodiment, a longitudinal temperature difference is determined on the basis of the plurality of the pieces of the recording material basis weight information. In constituent elements and control in this embodiment, with respect to the same constituent elements as those in the First Embodiment are represented by the same reference numerals or symbols and will be omitted from description. In the following, the description will be made with reference to FIGS. 9 to 11.

Figure 9:
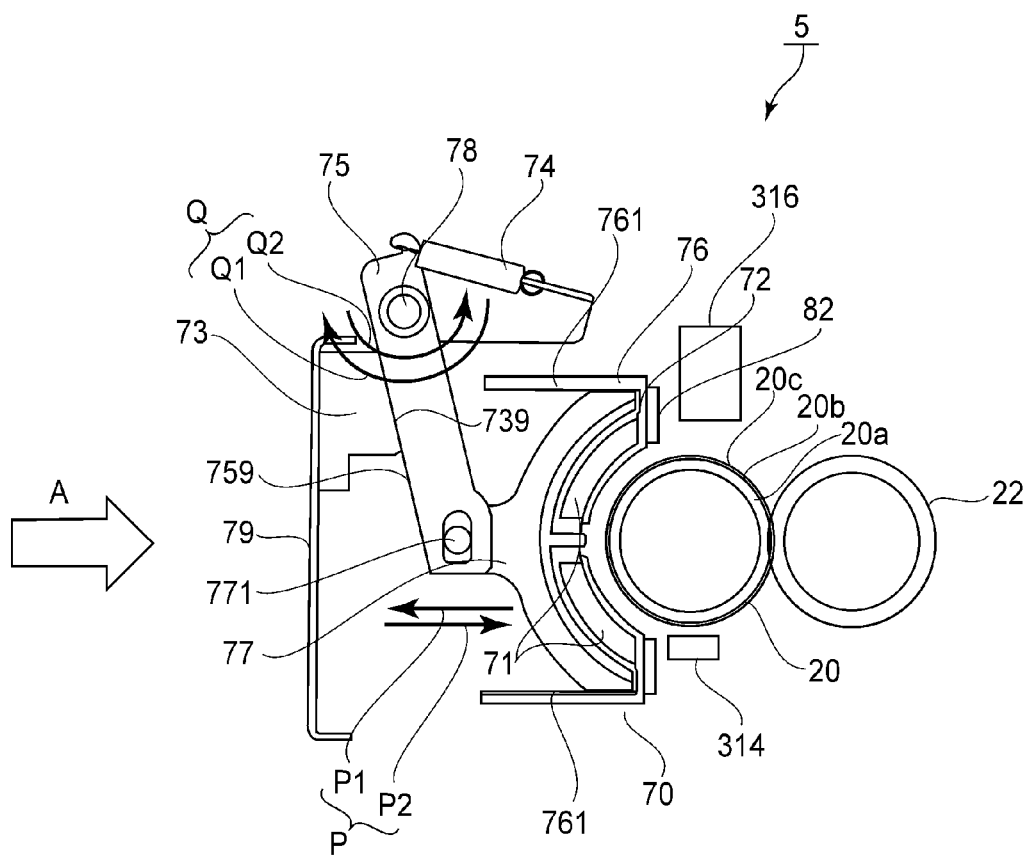
FIG. 9 is a sectional view for illustrating a fixing device in a Third Embodiment.
Figure 10:
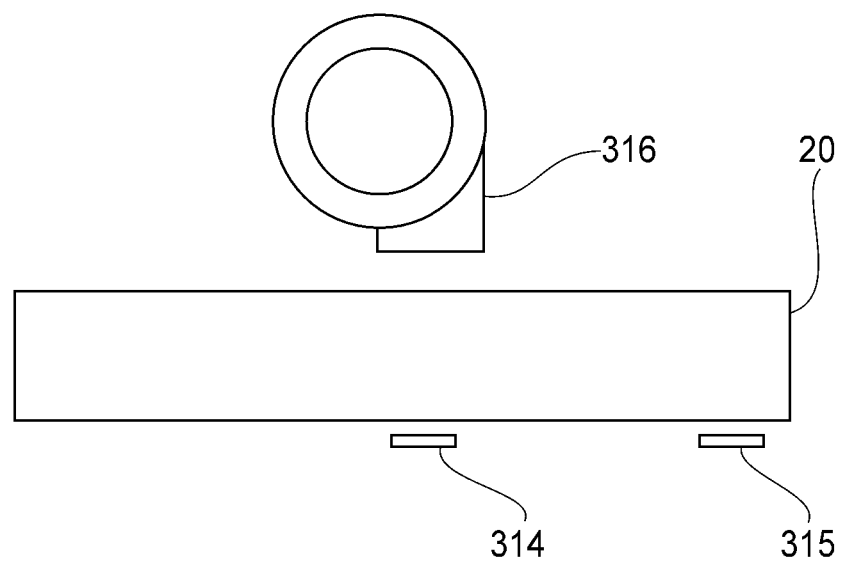
FIG. 10 is a top plan view for illustrating the fixing device in the Third Embodiment.
Figure 11:
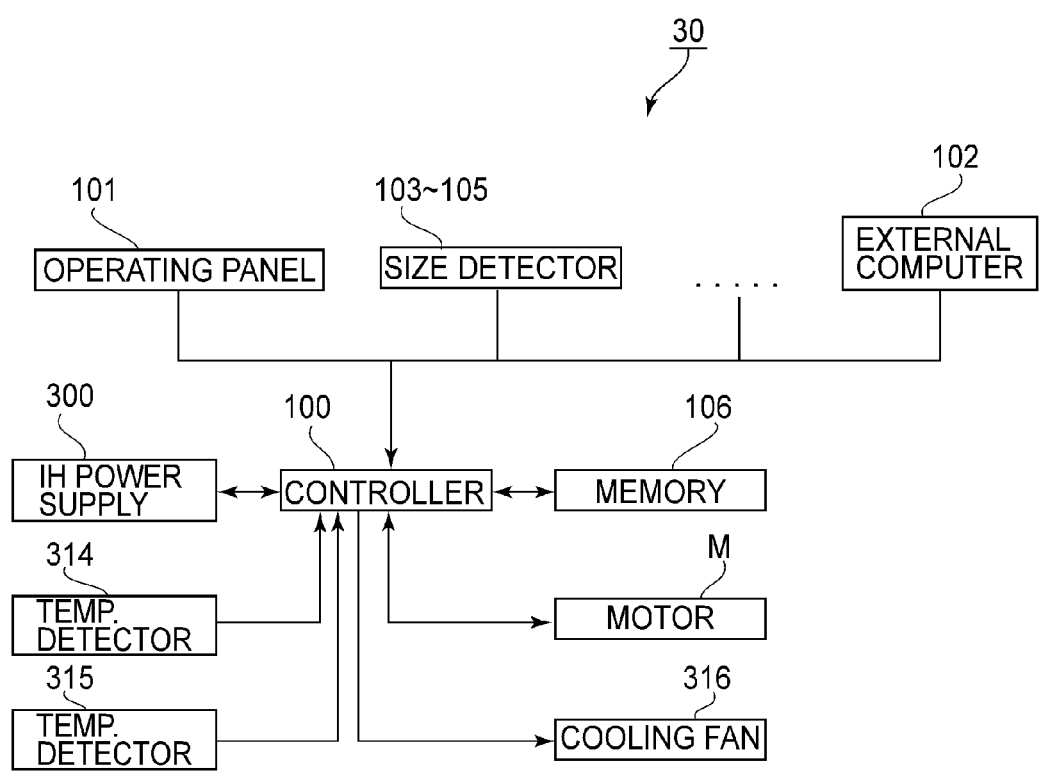
FIG. 11 is a block diagram for illustrating the fixing device in the Third Embodiment.

FIG. 9 is a sectional view of a fixing device 5 in this embodiment, and FIG. 10 is a schematic view of the fixing device 5, as seen from an arrow A direction of FIG. 9, from which the induction-heating device 70 is removed. Further, FIG. 11 is a block diagram of an image forming apparatus 30 in this embodiment. In this embodiment, as shown in FIGS. 9 and 10, a fixing roller 20 includes a central portion cooling fan 316 for cooling a longitudinal end portion of the fixing roller 20, and further includes an end portion temperature detecting member 314, for detecting a longitudinal end portion temperature, provided at a longitudinal end portion of the fixing roller 20.

The fixing roller 20 has a so-called crown shape such that an outer diameter (30.2 mm) thereof at the longitudinal end portion is larger than an outer diameter (30 mm) thereof at the longitudinal central portion. However, the fixing roller 20 can generate a temperature difference between the longitudinal central portion and the longitudinal end portion due to a print job performed immediately before the operation in this embodiment or due to heat distribution from the longitudinal end portion of the fixing roller 20. As a result, the fixing roller 20 causes a difference in thermal expansion due to the temperature difference, so that the outer diameter configuration provided in advance cannot be maintained, and therefore there is a fear that the recording material causes generation of creases.

For that reason, the central portion cooling fan 316 cools the longitudinal central portion of the fixing roller 20, whereby the thermal expansion of the fixing roller 20 at the longitudinal central portion is suppressed, and thus the outer diameter difference of the fixing roller 20 with respect to the longitudinal direction is controlled at a desired level. That is, by the controller 100 of FIG. 11, the temperature difference between a central portion temperature detecting member 314 and the end portion temperature detecting member 315 is detected, so that control of the central portion cooling fan 316 is carried out so as to provide a predetermined temperature difference.

When the temperature of the fixing roller 20 at the longitudinal central portion is higher than that at the longitudinal end portion, the outer diameter of the fixing roller 20 at the longitudinal central portion is increased, so that a feeding force at the longitudinal central portion is larger than that at the longitudinal end portion. As a result, the recording material causes the generation of creases.

Table 4 appearing later shows a temperature difference ΔTE (° C.), between the longitudinal central portion and the longitudinal end portion, in which the recording materials having several basis weights do not generate the creases. With respect to the recording material having a large basis weight, rigidity of the recording material itself is high, and therefore the creases are not readily generated. However, with respect to the recording material having a small basis weight, the rigidity is low (weak), and therefore the recording material is liable to cause buckling, so that the creases are liable to generate. As a result, as shown in Table 4, with respect to the recording materials having the large basis weights, there is no problem of the generation of the creases even when the temperature at the longitudinal central portion is high, but with respect to the recording material having the basis weight of about 52 g/m$^2$, the creases generates unless the temperature difference between the longitudinal central portion and the longitudinal end portion is 5° C. or less.

TABLE 4

| | BW*[1] (g/m$^2$): | | | | |
|---|---|---|---|---|---|
| | 52-63 | 64-82 | 83-105 | 106-220 | 221-300 |
| CETD*[2] ΔTE (° C.): | ≤5 | ≤10 | ≤20 | ≤30 | ≤30 |

*[1]"BW" representsthe basis weight.
*[2]"CETD" represents the temperature difference between the longitudinal central portion and the longitudinal end portion.

(Flow Chart)

Figure 12:
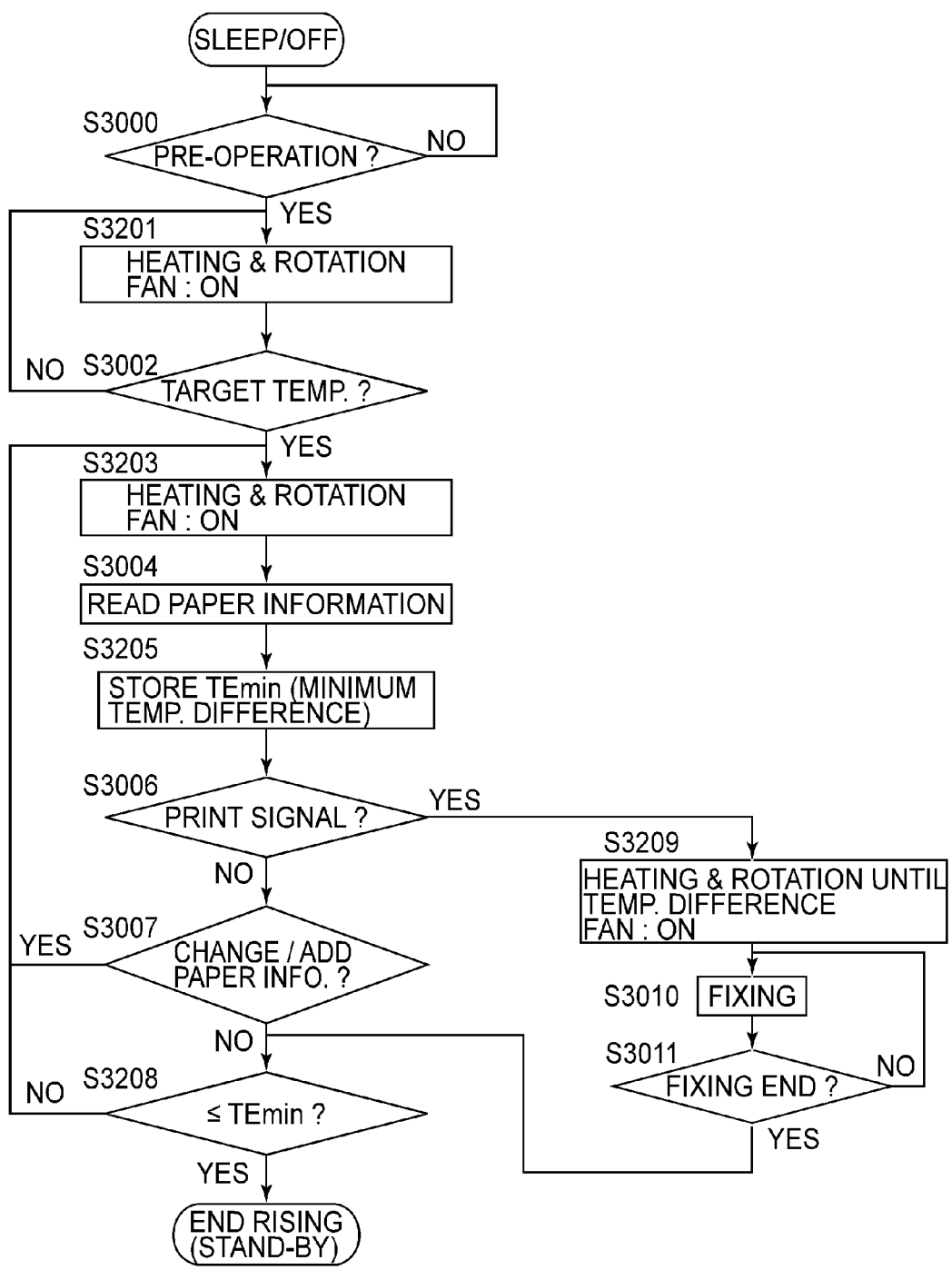
FIG. 12 is a flowchart for illustrating the fixing device in the Third Embodiment.

The operation in this embodiment will be described by using a flowchart of FIG. 12. In this embodiment, only steps different from the steps in the First Embodiment will be described. In the First Embodiment, in S3005, the longest one of the pre-heating times was calculated as the maximum pre-heating time Tmax and was used as the common permitted value. On the other hand, in this embodiment, a smallest one of temperature differences each between the longitudinal central portion and the longitudinal end portion is calculated as the smallest temperature difference TEmin between the central portion and the longitudinal end portion and is used as a common permitted value.

That is, in the memory 106, the controller 100 stores, as TEmin, the smallest temperature difference with respect to the recording material of the recording materials accommodated (mounted) in the recording material cassettes 103, 104 and 105 on the basis of the table (Table 4) showing the relationship between the basis weight of the recording material and the temperature difference of the fixing roller 20 between the longitudinal central portion and the longitudinal end portion (S3205).

In the step in which the heating and rotation were performed in the First Embodiment, control is effected so that the temperature difference is a predetermined temperature difference (between the longitudinal central portion and the longitudinal end portion of the fixing roller) by driving the central portion cooling fan 316 (S3201, S3203 and S3209). Further, when the temperature of the fixing roller reaches the fixable temperature, the start-up process is ended, and the state of the image forming apparatus goes to the stand-by mode (S3208). Further, in the case where there is the printing signal and the type of the recording material is known in advance, the fixing operation is started at the time when the temperature difference reaches the predetermined temperature difference on the basis of Table 4 (S3010).

Also in this embodiment, similarly as in the Second Embodiment, on the basis of detected humidity information of the temperature and humidity detecting portion (FIG. 3), it is possible to set the above-described common permitted value TEmin to be compared with a measured value relating to the temperature difference. That is, in a low-humidity environment, rigidity of the recording material becomes high, and therefore the creases are not readily generated, so that it is possible to set the permitted value TEmin again on the basis of the information of the humidity sensor for detecting the humidity at a position in the neighborhood of the recording material.

According to this embodiment, with respect to the recording material (sheet) set in the recording material cassette by the user, the generation of the creases is suppressed and the user is prevented from waiting for start of the image formation more than necessary, so that the convenience to the user can be improved.

Modified Embodiments

The present invention is not limited to the above-described embodiments, but may also be variously modified within the scope of the concept of the present invention. For example, the present invention can also be carried out in other embodiments in which a part or all of the constituent elements of the embodiments described above are replaced with alternative constituent elements thereof so long as the preparatory operation during the actuation (including restoration from the sleep mode) is set correspondingly to the accommodated recording material.

Modified Embodiment 1

In First and Second Embodiments described above, the constitution in which the pre-heating time is set depending on the basis weight of the recording material is employed, but the present invention is not limited thereto. The pre-heating time may also be set depending on the size of the recording material. Specifically, when the width of the recording material is narrow, the electric power can be concentratedly supplied to a portion having a narrow heat generation width, and therefore the pre-heating time can be set at a short time. As a result, the user is prevented from waiting for the image formation start more than necessary, so that the convenience can be improved.

Similarly, in the Third Embodiment described above, the temperature difference TEmin is set on the basis of the basis weight of the recording material or the humidity, but the present invention is not limited thereto. The pre-heating time may also be set depending on the size of the recording material. Specifically, in the case where the length of the recording material with respect to the feeding direction is short, the creases are not readily generated, and therefore the temperature difference TEmin can be set at a large value. The reason why the temperature difference TEmin is settable in such a manner is that a difference in feeding amount of the recording material with respect to the direction perpendicular to the recording material feeding direction is accumulated with a decreasing distance to a trailing end of the recording material, and therefore the recording material having the short length with respect to the feeding direction can pass through the fixing nip N before the creases are generated. As a result, the user is prevented from waiting for the image formation start more than necessary, so that the convenience can be improved.

Modified Embodiment 2

The induction-heated rotatable member and the press-contact rotatable thereto, which are described in the embodiments described above are not limited to the rollers, but may also be belts or films. Further, in the embodiments described above, as the example of the image forming apparatus, the multi-function machine having the copying function and the printer function is described, but the present invention is not limited to such embodiments. The present invention is similarly applicable to a copying machine having only the copying function and an image forming apparatus as a multi-function machine having the copying function, the printer function and a facsimile function.

Modified Embodiment 3

In the above-described embodiments, as the fixing device the device for heating and fixing the unfixed toner image formed on the recording material (sheet) is described as an example, but the present invention is similarly applicable to the following device. For example, the present invention is applicable to also a device for increasing a glossiness of an image by heating and re-fixing the toner image temporarily fixed on the recording material (also in this case, the device is referred to as the fixing device).

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 167172/2013 filed Aug. 10, 2013, which is hereby incorporated by reference.

What is claimed is:

1. An image forming apparatus comprising:
a recording material accommodating portion configured to accommodate a recording material;
an image forming portion configured to form a toner image on the recording material fed from said recording material accommodating portion;
a fixing portion configured to heat-fix the toner image formed on the recording material by said image forming portion;
a storing portion configured to store information corresponding to a type of the recording material accommodated in said recording material accommodating portion;
a detecting portion configured to detect that an operator exists in a predetermined zone in a neighborhood of said image forming apparatus; and
an executing portion configured to execute a start-up process of said fixing portion, when said detecting portion detects the existence of the operator before said image forming apparatus receives an image formation instruction, over a time depending on the information stored in said storing portion.

2. An image forming apparatus according to claim 1, wherein said executing portion executes the start-up process depending on the type of the recording material identified with reception of the image formation instruction during a preceding start-up process.

3. An image forming apparatus according to claim 1, wherein when image formation is effected by receiving the image formation instruction from an external computer via a communication line, said executing portion executes the start-up process depending on the type of the recording material identified with reception of the image formation instruction.

4. An image forming apparatus according to claim 1, wherein said start-up process includes a process for increasing the temperature of said fixing portion to a target temperature and a process for continuously heating said fixing portion without introducing the recording material in a state in which the temperature of said fixing portion reaches the target temperature.

5. An image forming apparatus according to claim 4, wherein the target temperature is the same irrespective of the type of the recording material.

6. An image forming apparatus comprising:
a plurality of recording material accommodating portions each configured to accommodate a recording material;
an image forming portion configured to form a toner image on the recording material fed from one of said plurality of recording material accommodating portions;
a fixing portion configured to heat-fix the toner image formed on the recording material by said image forming portion;
a storing portion configured to store information corresponding to a type of the recording material accommodated in each of said plurality of recording material accommodating portions;
a detecting portion configured to detect that an operator exists in a predetermined zone in a neighborhood of said image forming apparatus; and
an executing portion configured to execute a start-up process of said fixing portion, when said detecting portion detects the existence of the operator before said image forming apparatus receives an image formation instruction, for the recording material requiring the longest time for performing the start-up process, depending on the information stored in said storing portion.

7. An image forming apparatus according to claim 6, wherein said executing portion executes the start-up process depending on the type of the recording material identified with reception of the image formation instruction during preceding start-up process.

8. An image forming apparatus according to claim 6, wherein when image formation is effected by receiving the image formation instruction from an external computer via a communication line, said executing portion executes the start-up process depending on the type of the recording material identified with reception of the image formation instruction.

9. An image forming apparatus according to claim 6, wherein said start-up process includes a process for increasing the temperature of said fixing portion to a target temperature and a process for continuously heating said fixing portion without introducing the recording material in a state in which the temperature of said fixing portion reaches the target temperature.

10. An image forming apparatus according to claim 9, wherein the target temperature is the same irrespective of the type of the recording material.

* * * * *